3,584,999
MANUFACTURE OF PHOSPHORUS PENTAFLUORIDE

Robert A. Wiesboeck, Atlanta, Ga., assignor to United States Steel Corporation, Pittsburgh, Pa.
No Drawing. Filed Jan. 16, 1968, Ser. No. 698,128
Int. Cl. C01b 25/10
U.S. Cl. 23—205                10 Claims

ABSTRACT OF THE DISCLOSURE

Phosphoryl fluoride is reacted with hydrogen fluoride to form phosphorus pentafluoride and hexafluorophosphoric acid, and the hexafluorophosphoric acid may be reacted with sulfur trioxide, pyrosulfuric acid or fluorosulfonic acid to form additional phosphorus pentafluoride. The hexafluorophosphoric acid from any source may be reacted with the sulfur trioxide and/or pyrosulfuric acid to liberate phosphorus pentafluoride.

BACKGROUND AND SUMMARY

Conventional processes for the manufacture of phosphorus pentafluoride are based on the halogen exchange of phosphorus pentachloride with a fluoride; i.e., arsenic trifluoride, $$3PCl_5 + 5AsF_3 \rightarrow 3PF_5 + 5AsCl_3$$

or on the chlorofluorination of phosphorus trifluoride, $$5PF_3 + 3Cl_2 \rightarrow 3PF_5 + 2PCl_3$$

Both methods require extensive fractionation to separate mixed halides from phosphorus pentafluoride.

I have discovered that phosphorus pentafluoride can be produced in high purity without resorting to complex operations. Any impurities in the product are of such nature that they can easily be removed by inexpensive procedures. In contrast to the conventional methods, the phosphorus pentafluoride produced is free of chlorine.

Phosphoryl fluoride reacts with hydrogen fluoride to form phosphorus pentafluoride, $$POF_3 + 2HF \rightarrow PF_5 + [H_2O]$$

The resulting water shown in the above equation is immediately consumed by the formation of hexafluorophosphoric acid hydrate, $$POF_3 + 3HF + [1 \text{ mole } H_2O] \rightarrow HPF_6 \cdot 2H_2O$$

The hexafluorophosphoric acid produced as above described or from any source may be reacted with a water-removing agent such as sulfur trioxide or pyrosulfuric acid to obtain phosphorus pentafluoride.

Hexafluorophosphoric acid is stable at room temperature and above only as a solution in highly polar media such as water. I have found that removal of water by chemical means liberates phosphorus pentafluoride in substantial amounts. Typical reagents for the removal of water are sulfur trioxide, pyrosulfuric acid or fluorosulfonic acid, $$HPF_6 \cdot xH_2O + xSO_3 \rightarrow PF_5 + HF + xH_2SO_4$$

The liberated phosphorus pentafluoride is obtained in high purity.

DETAILED DESCRIPTION

Phosphoryl fluoride and hydrogen fluoride are preferably combined in the cold, warmed to room temperature, and subsequently heated under autogenous pressure to about 60–80° C. The volatile material may then be vented and the phosphorus pentafluoride recovered therefrom by condensing or by any other suitable method.

Alternatively, the $POF_3$ may be pumped into a reactor containing the hydrogen fluoride and the reaction carried out at 10–100° C. or higher.

The mole ratio of the reactants is not critical; however, best results were obtained when 2–4 (preferably 3) moles of hydrogen fluoride are employed per mole of phosphoryl fluoride.

Approximately one-half of the $POF_3$ is converted to $PF_5$ of high purity. If the product is removed from the reactor at temperatures above 20° C., some hydrogen fluoride and a trace of phosphoryl fluoride are also obtained. These impurities can be separated by fractional condensation at −40° C.

The remaining liquid phase of the reaction mixture is essentially 60–65 percent hexafluorophosphoric acid. The yield of phosphorus pentafluoride can be increased by reaction of the remaining liquid with sulfur trioxide, as described hereinafter. Total conversion of $POF_3$ to $PF_5$, employing both methods, ranged from 70–80 percent.

Starting with the hexafluorophosphoric acid produced as above described or obtained from any source, the hexafluorophosphoric acid solutions contain the acid as an equilibrium mixture involving hydrogen fluoride and mono- and difluorophosphoric acid, as follows:

$$H_2[PO_3F] \underset{H_2O}{\overset{HF}{\rightleftharpoons}} H[PO_2F_2] \underset{2H_2O}{\overset{4HF}{\rightleftharpoons}} H[PF_6]$$

The composition of commercial 65 percent hexafluorophosphoric acid has been shown to consist of 25 mole percent $HPF_6$, 1 mole percent $HPO_2F_2$, 1 mole percent $H_2PO_3F$, 7 mole percent HF and 66 mole percent $H_2O$.

Attempts to concentrate 65 percent $HPF_6$ lead to decomposition, shifting the equilibrium to mono- and difluorophosphoric acid and hydrogen fluoride:

$$HPF_6 + 2H_2O \rightarrow HPO_2F_2 + 4HF$$

$$HPO_2F_2 + H_2O \rightarrow HPO_3F + HF$$

However, I have found removal of water without shifting the equilibrium can be achieved by chemical means. If a solution of hexafluorophosphoric acid is treated with sulfur trioxide, preferably in the cold, the water of the system is chemically bonded through the formation of sulfuric acid.

On warming, the hexafluorophosphoric acid cannot hydrolyze and is forced to decompose into phosphorus pentafluoride and hydrogen fluoride, $$HPF_6 \rightarrow PF_5 + HF$$

Depending on the quantities of sulfur trioxide employed, part or all of the hydrogen fluoride is converted to fluorosulfonic acid, $$HF + SO_3 \rightarrow HSO_3F$$

It is advantageous to use a minimum of 1.0–1.3 moles of sulfur trioxide per mole of water present in the hexafluorophosphoric acid. The sulfur trioxide can be condensed into a cooled reactor containing the hexafluorophosphoric acid or it can be added from a pressurized container at room temperature or above. Solutions of sulfur trioxide in inert solvents, i.e., tetrachloroethylene, are also suitable.

The liberated $PF_5$ is of high purity and contains only small amounts of $POF_3$ and HF which can be removed by fractional condensation.

On a plant scale, I would prefer to maintain the hexafluorophosphoric acid in a pool at a temperature of about 0–100° C. (preferably about 30° C.) and to introduce the $SO_3$ below the surface of the pool. Instead of $SO_3$, pyrosulfuric acid, fluorosulfonic acid and the like may be used.

Specific examples illustrative of the invention may be set out as follows:

EXAMPLE I

Commercial 65 percent hexafluorophosphoric acid (22.5 g.) was placed in an aluminum cylinder, cooled to −196° C. and evcuated. Sulfur trioxide (45.0 g.) was condensed into the cylinder and the mixture was allowed to warm to room temperature. A pressure of 48 p.s.i. developed, which increased to 81 p.s.i. on heating to 60° C. The formed phosphorus pentafluoride (6.8 g.) was collected by expansion into an evacuated cold trap maintained at −196° C.

EXAMPLE II

Sulfur trioxide (11.0 g.) was condensed into 75 percent hexafluorophosphoric acid (10.5 g.) at −196° C. as described in Example I. A pressure of 58 p.s.i. developed on warming the mixture to 60° C. After one hour, the volatile material was expanded into an attached cold trap maintained at −196° C. The obtained phosphorus pentafluoride (4.2 g.) corresponded to a 62 percent conversion of the hexafluorophosphoric acid.

EXAMPLE III

Hydrogen fluoride (41.0 g.) was condensed into an evacuated aluminum reactor at −80° C. and pressurized with phosphoryl fluoride (65.0 g.). The reaction mixture was allowed to warm to room temperature. A pressure of 130 p.s.i. developed. After heating to 50° C. for one hour, volatile material was vented into a cold (−196° C.) stainless steel cylinder. A total of 42 g. of phosphorus pentafluoride was obtained.

EXAMPLE IV

An evacuated aluminum cylinder was charged with hydrogen fluoride (7.2 g.) and subsequently pressurized with phosphoryl fluoride (11.3 g.) at 10° C. Within 30 minutes, a permanent pressure of 62 p.s.i. developed. After heating to 60° C. for one hour, the cylinder was cooled to 25° C. and volatile material vented into a trap maintained at −196° C. A total yield of 7.5 g. of phosphorus pentafluoride was obtained.

EXAMPLE V

Hexafluorophosphoric acid (45.5 g.) containing 75 percent $HPF_6$ was added dropwise to fluorosulfonic acid (50.0 g.) at 20-30° C. while stirring. The evolved gas was passed into an attached cylinder and cooled to −196° C. A total of 21.2 g. of volatile material was collected which was fractionated at −78° C. into 19.2 g. phosphorus pentafluoride and 2.0 g. hydrogen fluoride.

While in the foregoing specifications, I have set out specific procedure in considerable detail for the purpose of illustrating embodiments of the invention, it will be understood that such details may be varied widely by those skilled in the art without departing from the spirit of the invention.

I claim:
1. In a process for the preparation of phosphorus pentafluoride, the steps of reacting phosphoryl fluoride with hydrogen fluoride to form phosphorus pentafluoride and hexafluorophosphoric acid, and reacting the resulting hexafluorophosphoric acid with an agent selected from the group consisting of sulfur trioxide, pyrosulfuric acid and fluorosulfonic acid to produce additional phosphorus pentafluoride.

2. The process of claim 1 in which said phosphoryl fluoride and said hydrogen fluoride are combined in the cold and heated to about 60–80° C.

3. The process of claim 1 in which the phosphoryl fluoride is pumped into a reactor containing the hydrogen fluoride and reacted therein at a temperature of about 10–100° C.

4. The process of claim 1 in which 2–4 moles of hydrogen fluoride are employed per mole of phosphoryl fluoride.

5. In a process for the preparation of phosphorus pentafluoride, the steps of reacting hexafluorophosphoric acid containing water with a water-removal agent selected from the group consisting of sulfur trioxide, pyrosulfuric acid and fluorosulfonic acid, and combinations thereof, heating the reactants under pressure, and recovering the volatilized material.

6. The process of claim 5 in which sulfur trioxide is introduced in an inert solvent.

7. The process of claim 5 in which the hexafluorophosphoric acid is cooled to about −196° C., the sulfur trioxide condensed and combined therewith, and the reactants warmed to produce phosphorus pentafluoride, and the volatile material is recovered as product.

8. The process of claim 5 in which at least 1.0–1.3 moles of sulfur trioxide are employed per mole of water present in the hexafluorophosphoric acid.

9. The process of claim 5 in which a pool of hexafluorophosphoric acid is maintained at about 0–100° C. and sulfur trioxide is introduced into the pool.

10. In a process for the preparation of phosphorus pentafluoride, the steps of reacting, in the cold, phosphoryl fluoride with two to four equivalents of hydrogen fluoride to form phosphorus pentafluoride and hexafluorophosphoric acid, removing, at a temperature below +20° C., the gaseous reaction products, heating under pressure the remaining hexafluorophosphoric acid with greater than a stoichiometric amount of an agent selected from the group consisting of sulfur trioxide, pyrosulfuric acid and fluorosulfonic acid and removing the volatized material.

References Cited
UNITED STATES PATENTS

| | | | |
|---|---|---|---|
| 2,488,298 | 11/1949 | Lange et al. | 23—139 |
| 2,718,456 | 9/1955 | Mulder et al. | 23—139 |

HERBERT T. CARTER, Primary Examiner

U.S. Cl. X.R.

23—139